United States Patent [19]

Stein

[11] 3,908,262

[45] Sept. 30, 1975

[54] PROCESS FOR THE PRODUCTION OF A TWO-PHASE CHARGE SHIFT ARRANGEMENT FOR CHARGE COUPLED DEVICES

[75] Inventor: Karl-Ulrich Stein, Munich, Germany

[73] Assignee: Siemens Aktiengesellschaft, Berlin & Munich, Germany

[22] Filed: July 31, 1974

[21] Appl. No.: 493,267

[30] Foreign Application Priority Data

Aug. 14, 1973 Germany ............................ 2341154

[52] U.S. Cl. ...................................... 29/579; 357/91
[51] Int. Cl.[2] ........................................... B01J 17/00
[58] Field of Search .................. 29/576 B, 579, 578; 357/91

[56] References Cited

UNITED STATES PATENTS

| | | | |
|---|---|---|---|
| 2,666,814 | 1/1954 | Shockley | 357/91 |
| 3,775,192 | 11/1973 | Beale | 357/91 |
| 3,796,932 | 3/1974 | Amelio | 357/91 |
| 3,851,379 | 12/1974 | Gutknecht | 29/579 |

*Primary Examiner*—W. Tupman
*Attorney, Agent, or Firm*—Hill, Gross, Simpson, Van Santen, Steadman, Chiara & Simpson

[57] ABSTRACT

A process for the production of a two-phase charge shift arrangement for a charge coupled device with a doping barrier which includes forming an electrically insulating layer on a semiconductor substrate, forming a metal layer on said insulating layer, covering said metal layer with a photo-resist layer, selectively etching said photo-resist layer and through said metal layer to provide a row of electrodes, the etching operation including under-etching the photo-resist layer at each gap to provide a wider gap in the electrode than in the photo-resist, the ratio of the width of the gap in the photo-resist to the total gap height being approximately 1:1, and then irradiating the gaps with an ion beam directed at an oblique angle to the surface of the substrate to cause ions to be implanted in the substrate below one edge region of each electrode and in the substrate below a portion of the bottom of the gap adjacent said one side edge of each said electrode.

5 Claims, 3 Drawing Figures

PROCESS FOR THE PRODUCTION OF A TWO-PHASE CHARGE SHIFT ARRANGEMENT FOR CHARGE COUPLED DEVICES

FIELD OF THE INVENTION

The invention relates to a process for the production of a two-phase charge shift arrangement in accordance with the charge-coupled device principle, with a doping barrier, wherein an electrically insulating layer is applied to a substrate of semiconductor material, and wherein individual electrodes separated from one another by gaps are applied to this layer with the aid of photolithographic process steps, and wherein ion implantation is used to introduce charge carriers fundamentally in the edge regions under the electrodes, at an oblique direction to the substrate surface.

Two-phase charge shift arrangements of this type are known. For example, the German Patent Application laid open for public inspection, OS No. 2,201,395, describes an arrangement in which, by means of an oblique ion implantation, an additional doping of the substrate is produced under one edge of each electrode. For this purpose, however, it is necessary, in order to implant only a few ions in the region between the electrodes, that the ratio of the gap height to the gap width of the gaps between the individual electrodes should be approximately 1:1. However, this ratio is difficult to achieve with conventional etching techniques.

SUMMARY OF THE INVENTION

An object of the invention is to provide a process for the production of two-phase charge shift arrangements by which these difficulties are avoided.

This object is attained by a process which is characterized in accordance with the invention by the fact that for the production of the implanted zones, prior to the production of the individual electrodes, a photoresist layer is applied to the layer from which the electrodes are produced. This photo-resist layer is not removed following the production of the individual electrodes, and the ions are implanted in an oblique direction through the gaps between the individual electrodes and through the openings formed by the photo-resist layer.

A fundamental advantage of the process of the invention lies in the fact that gaps having a ratio of height to width of approximately 1:1 may be produced relatively easily in photo-resist layers.

The etching mask which is also employed as mask for the implantation is already adjusted with respect to the gaps between the electrodes.

DESCRIPTION OF THE PREFERRED EMBODIMENTS

Figure 1:
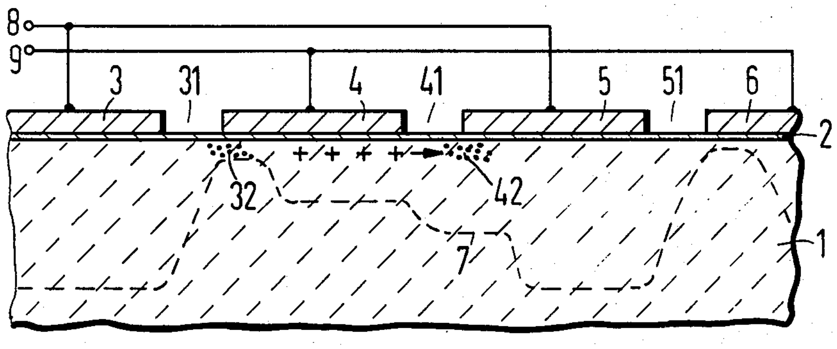
FIG. 1 schematically illustrates a charge shift arrangement in the two-phase technique with obliquely implanted doping.

FIG. 1 illustrates a charge shift arrangement in the two-phase technique, in which the electrically insulating layer 2 is applied on the substrate 1 which substrate preferably consists of silicon. Preferably the layer 2 is formed of silicon dioxide. Individual electrodes 3 to 6 are arranged on the layer 2. These electrodes, which are separated from one another by the gaps 31 to 51 preferably consist of aluminum. All of the odd-numbered electrodes, i.e, the electrodes 3 and 5 in FIG. 1, for example, are connected in parallel to a terminal 8, and the even-numbered electrodes, i.e., the electrodes 4 and 6 in FIG. 1, are connected to a terminal 9. The doped zones which are produced by means of oblique ion implantation are identified as 32 and 42. The broken line 7 refers to the potential course produced on the semiconductor surface during the charge shift process.

Figure 2:
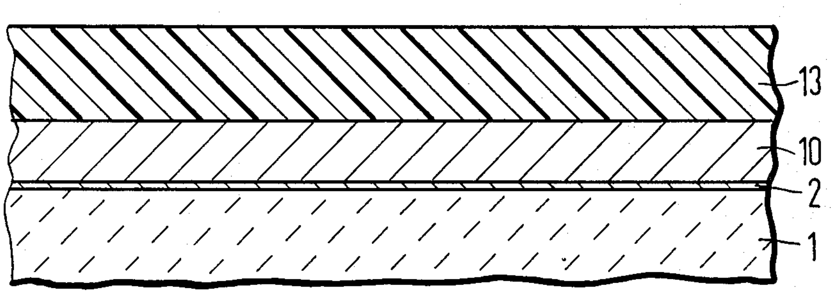
FIG. 2 shows the charge shift arrangement prior to the etching of the gaps.
Figure 3:
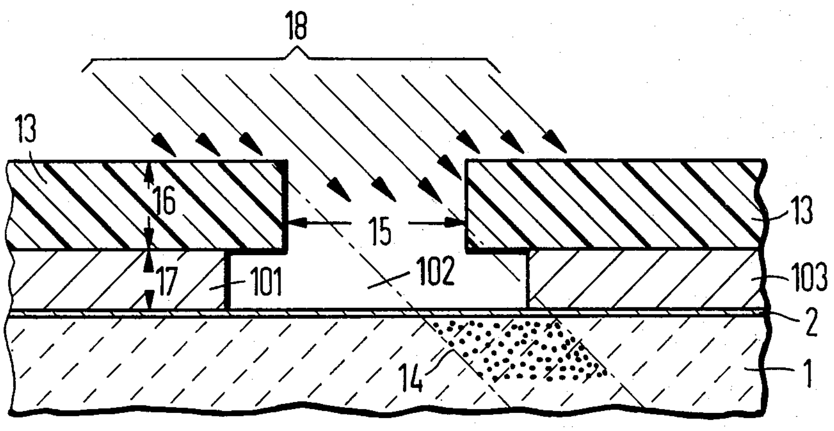
FIG. 3 schematically illustrates a cross-section through a gap of a charge shift arrangement in the two-phase technique in which, in accordance with the invention, in the ion implantation, a photo-resist layer is arranged on the electrodes.

FIGS. 2 and 3 show individual steps of the process of the invention for the production of two-phase charge shift arrangements. Details of FIGS. 2 and 3 which have already been described in association with FIG. 1 bear corresponding reference numerals. In FIG. 2, on the electrically insulating layer 2 there is arranged a metal layer 10 from which, in later process steps, the individual electrodes of the charge shift arrangement are produced. Preferably, this layer 10 consists of aluminum. A photo-resist layer 13 is applied to the layer 10. Preferably, this photo-resist layer is applied in the form of a lacquer or foil. With the aid of this photo-resist layer 13 and with photolithographic process steps, the individual electrodes and the gaps between the electrodes are produced in the layer 10. For this purpose first openings are produced in the photo-resist layer 13. In further process steps, as illustrated in FIG. 3, the openings 102 are etched into the layer 10 beneath the openings in the photo-resist layer 13. Here the photo-resist layer 13 serves as an etching mask. On account of under-etching, the opening 102 in the layer 10 is larger than the opening above it in the photo-resist layer 13.

Preferably, the width, shown by the reference 15, of the opening in the photo-resist layer 13 amounts to approximately 3$\mu$m. The thickness of this layer referenced 16 is approximately 2 $\mu$m, and the thickness of the underlying metal electrodes 101 and 102 is approximately 1 $\mu$m.

These dimensions can also be reduced by about the factor 2.

In accordance with the invention, as a result of the fact that the photo-resist layer 13 is left upon the electrodes 101 and 103, the ratio of the height to the width of the opening governed by the opening in the photoresist layer 13 (arrow 15) is approximately 1:1.

The zone 14 is implanted with ions by an oblique ion implantation through the opening, referenced 15, in the photo-resist layer 13 and the underlying opening 102. In FIG. 3, the ion beam, directed obliquely to the substrate surface, is referenced 18. Following the ion implantation, following the production of the zone 14, the photo-resist layer 13 is removed. When this photoresist layer has been dissolved, in order to improve the potential course, in addition, a known perpendicular ion implantation may be carried out through the gap. A perpendicular ion implantation of this kind advantageously does not require any additional masking steps.

It will be apparent to those skilled in the art that many modifications and variations may be effected without departing from the spirit and scope of the novel concepts of the present invention.

I claim as my invention:

1. A process for the production of a two-phase charge shift arrangement for a charge coupled device which includes:

forming an electrically insulating layer on a semiconductor substrate, forming a metal layer on said insulating layer, covering said metal layer with a photo-resist layer, selectively etching said photo-resist layer and said metal layer to form a row of gaps which extend completely through said photo-resist layer and said metal layer to provide a row of electrodes, the etching step including under-etching said photo-resist layer in each of said gaps to provide a wider gap in said metal layer than in said photo-resist layer, the ratio of the width of said gap in said photo-resist layer to the total height of said gap through both said photo-resist layer and said metal layer being approximately 1:1, and then irradiating said gaps with an ion beam directed at an angle to the surface of said substrate to cause ions to be implanted in said substrate below one edge region of each of said electrodes and in said substrate below a portion of the bottom of said gaps adajcent said one side of each said electrode.

2. A process as set forth in claim 1, in which the gap width in said photo-resist layer is 2–4 $\mu$, the thickness of said photo-resist layer is 1–3 $\mu$, and the thickness of said electrodes is 0.5 – 1.5 $\mu$.

3. A process as set forth in claim 2, in which said substrate is silicon.

4. A process as set forth in claim 3, in which said insulating layer is $SiO_2$.

5. A process as set forth in claim 4, in which said metal layer is aluminum.

* * * * *